US012576793B2

(12) United States Patent
Tatemura et al.

(10) Patent No.: US 12,576,793 B2
(45) Date of Patent: Mar. 17, 2026

(54) VEHICLE

(71) Applicant: ISUZU MOTORS LIMITED,
Yokohama (JP)

(72) Inventors: Ryo Tatemura, Fujisawa (JP); Masato Eguchi, Fujisawa (JP)

(73) Assignee: ISUZU MOTORS LIMITED,
Yokohama (JP)

( * ) Notice: Subject to any disclaimer, the term of this patent is extended or adjusted under 35 U.S.C. 154(b) by 131 days.

(21) Appl. No.: 18/436,495

(22) Filed: Feb. 8, 2024

(65) Prior Publication Data

US 2024/0294121 A1     Sep. 5, 2024

(30) Foreign Application Priority Data

Mar. 3, 2023     (JP) ................................. 2023-032416

(51) Int. Cl.
B60R 11/00 (2006.01)
G01S 13/931 (2020.01)

(52) U.S. Cl.
CPC ......... B60R 11/00 (2013.01); B60R 2011/004 (2013.01); B60R 2011/0085 (2013.01); B60R 2011/0092 (2013.01); G01S 13/931 (2013.01); G01S 2013/9315 (2020.01); G01S 2013/93274 (2020.01)

(58) Field of Classification Search
CPC ............... B60R 11/00; B60R 2011/004; B60R 2011/0085; B60R 2011/0092; B60R 1/06;

B60R 1/12; B60R 2001/1223; B60R 1/0605; B60R 2011/008; G01S 2013/9315; G01S 2013/93274; G01S 13/931

See application file for complete search history.

(56) References Cited

U.S. PATENT DOCUMENTS

| | | | |
|---|---|---|---|
| 2019/0132497 A1 | 5/2019 | Lang et al. | |
| 2021/0233407 A1* | 7/2021 | Schondorf | .............. B60R 11/04 |
| 2022/0227295 A1* | 7/2022 | Salter | .................... B60K 13/06 |

FOREIGN PATENT DOCUMENTS

| | | |
|---|---|---|
| JP | S55-073455 U | 11/1980 |
| JP | H03-014100 A | 1/1991 |
| JP | 2001-191847 A | 7/2001 |
| JP | 2001-233133 A | 8/2001 |
| JP | 2001-334872 A | 12/2001 |
| JP | 2011-253486 A | 12/2011 |
| JP | 2019-108114 A | 7/2019 |

* cited by examiner

*Primary Examiner* — Abdhesh K Jha
*Assistant Examiner* — Brandon S Lee
(74) *Attorney, Agent, or Firm* — PROCOPIO, CORY, HARGREAVES & SAVITCH LLP

(57) ABSTRACT

A vehicle includes: a vehicle cabin where the driver sits, a sensor that is arranged below an outside mirror of the vehicle cabin and detects a region behind the vehicle; a sensor arm that is provided separately form the mirror arm supporting the outside mirror and is a support member that supports the sensor; and a support mechanism that pivotally supports the sensor arm relative to the vehicle cabin.

7 Claims, 5 Drawing Sheets

S100

VEHICLE

CROSS-REFERENCE TO RELATED APPLICATIONS

The present application claims priority to Japanese Patent Application number 2023-32416, filed on Mar. 3, 2023 contents of which are incorporated herein by reference in their entirety.

BACKGROUND OF THE INVENTION

The present disclosure relates to a vehicle. Conventionally, there has been known a technique of detecting the presence of a pedestrian or a bicycle around a vehicle by using a radar provided on the outside of the vehicle. Further, Japanese Unexamined Patent Application Publication No. 2011-253486 discloses a configuration in which a camera, instead of a radar, is attached to a support member of a door mirror and the camera images a region behind the vehicle, for example.

The configuration of Japanese Unexamined Patent Application Publication No. 2011-253486 faces difficulty in effectively adjusting the sensor's position for object detection around a vehicle.

BRIEF SUMMARY OF THE INVENTION

The present disclosure has been made in view of these points, and its object is to provide a vehicle that facilitates easy adjustment of the sensor's position for detecting objects around the vehicle.

A vehicle according to one implementation of the present disclosure includes: a vehicle cabin where a driver sits; a sensor that is arranged below an outside mirror of the vehicle cabin and detects a region behind a vehicle; a support member that is provided separately from a mirror arm supporting the outside mirror and supports the sensor; and a support mechanism that pivotally supports the support member relative to the vehicle cabin.

According to the present disclosure, it is possible to provide a vehicle that facilitates easy adjustment of a sensor's position for detecting objects around the vehicle.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

Figure 1:
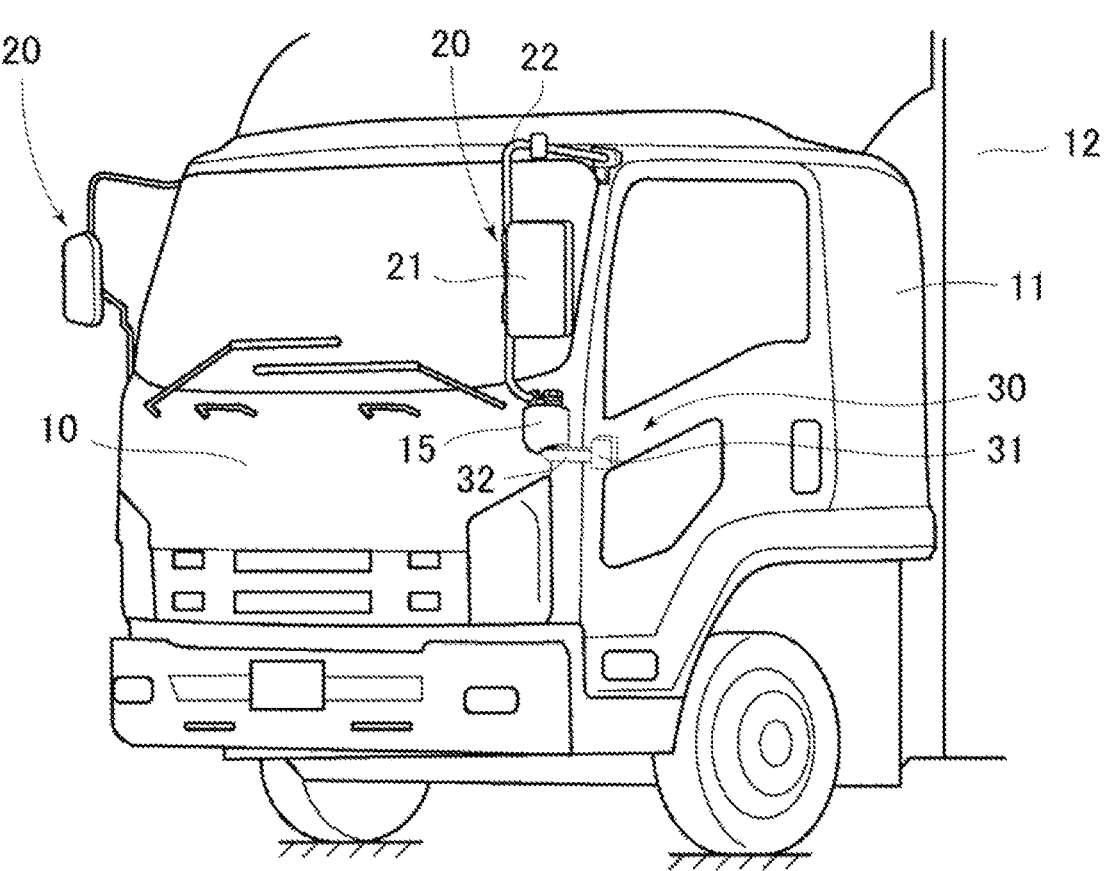
FIG. 1 is a diagram showing a vehicle according to one implementation of the present disclosure.
Figure 2:
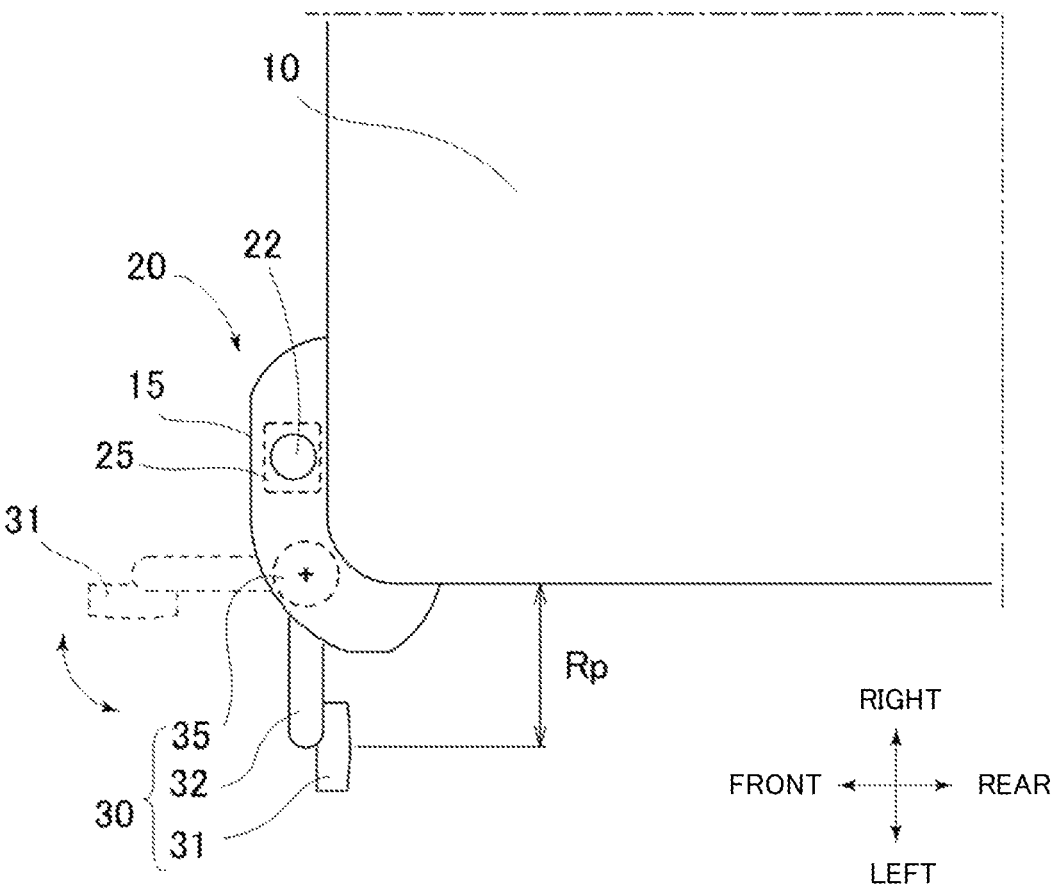
FIG. 2 is a diagram illustrating configurations of a mirror unit and a sensor unit.

FIG. 1 is a diagram showing a vehicle according to one implementation of the present disclosure. FIG. 2 is a diagram illustrating configurations of a mirror unit and a sensor unit. FIG. 2 is a schematic diagram of a part of a vehicle cabin when viewed from the top.

As shown in FIG. 1, the vehicle S100 includes a vehicle cabin 10, mounted equipment 12, a mirror unit 20, and a sensor unit 30. The vehicle S100 is a truck, for example.

The vehicle cabin 10 is positioned at the front of the vehicle S100 and is a portion where a driver sits. The mounted equipment 12 is mounted on the vehicle S100 depending on the application of the vehicle S100. The mounted equipment 12 is a box body that accommodates loads, such as products, for example. Pieces of mounted equipment 12 in various sizes are mounted on the vehicle S100. The size of the mounted equipment 12 and the positional relationship between the sensor unit 30 and the sensor 31 will be described later with reference to other drawings.

The mirror unit 20 is provided at the front of the vehicle cabin 10. In the following description, the mirror unit 20 provided to the front of the vehicle cabin 10 on the left side will be described. The mirror unit 20 mainly includes an outside mirror 21, a mirror arm 22, and a connecting part 25 (see FIG. 2).

The outside mirror 21 is supported by the mirror arm 22. The mirror arm 22 is a bent rod-shaped member. The mirror arm 22 is provided such that it protrudes upward from the cover 15 (see FIG. 5). The mirror arm 22 is provided to be pivotable relative to the vehicle cabin 10.

The connecting part 25 is a structure that connects one end of the mirror arm 22 to the vehicle cabin 10. The connecting part 25 rotatably supports one end of the mirror arm 22. As shown in FIG. 2, the connecting part 25 is disposed inside the cover 15 that is provided in a manner to protrude from the vehicle cabin 10.

The cover 15 is a cover protruding forward from the vehicle cabin 10, as an example. The cover 15 forms an internal space for housing the connecting part 25 and the support mechanism 35, as will be described later. As an example, the cover 15 also protrudes to a side surface side of the vehicle cabin 10. It should be noted that the shape of the cover 15 shown in FIG. 1 and the shape of the cover 15 shown in FIG. 2 are different from each other, but this difference is not essential to the present disclosure. The cover 15 may be provided as a part of a front panel of the vehicle, or may be a separate member attached to the front panel.

The connecting part 25 includes a motor and a transmission mechanism (both not shown) that transmits a driving force from the motor, for example. The connecting part 25 is provided such that the motor is driven to pivot the mirror arm 22 when the driver presses a predetermined switch in the vehicle cabin 10, as an example. This configuration allows the outside mirror 21 to move between an open position and a closed position.

As shown in FIGS. 1 and 2, the sensor unit 30 includes the sensor 31, the sensor arm 32, and the support mechanism 35.

The sensor 31 is a radar for detecting an object around the vehicle S100, for example. In the present embodiment, the sensor 31 is a radar that detects regions to the sides and rear (rearward from the sensor 31) of the vehicle S100. The radar provided as the sensor 31 is not limited to a specific radar, and may be any radar.

As shown in FIG. 1, the sensor 31 is arranged below the outside mirror 21. Specifically, the sensor 31 is arranged below the cover 15. The sensor 31 may be provided at any position, but having the sensor 31 provided at a relatively low position, such as below the outside mirror 21 as described in the configuration of the present embodiment, offers an advantage that it can effectively detect objects, which are low in height, that are present to the sides of the vehicle S100.

The sensor arm 32 is an arm provided separately from the mirror arm 22. In the example of FIG. 1, the sensor arm 32 is provided on the lower surface of the cover 15. The sensor arm 32 is a rod-shaped support member having a predetermined length, and supports the sensor 31 at its distal end.

The sensor 31 may be attached to the sensor arm 32 such that its angle relative to the sensor arm 32 can be changed, or may be attached to the sensor arm 32 such that the angle relative to the sensor arm 32 cannot be changed.

The support mechanism 35 supports an end of the sensor arm 32. As shown in FIG. 2, the support mechanism 35 pivotally supports the sensor arm 32.

Figure 5:
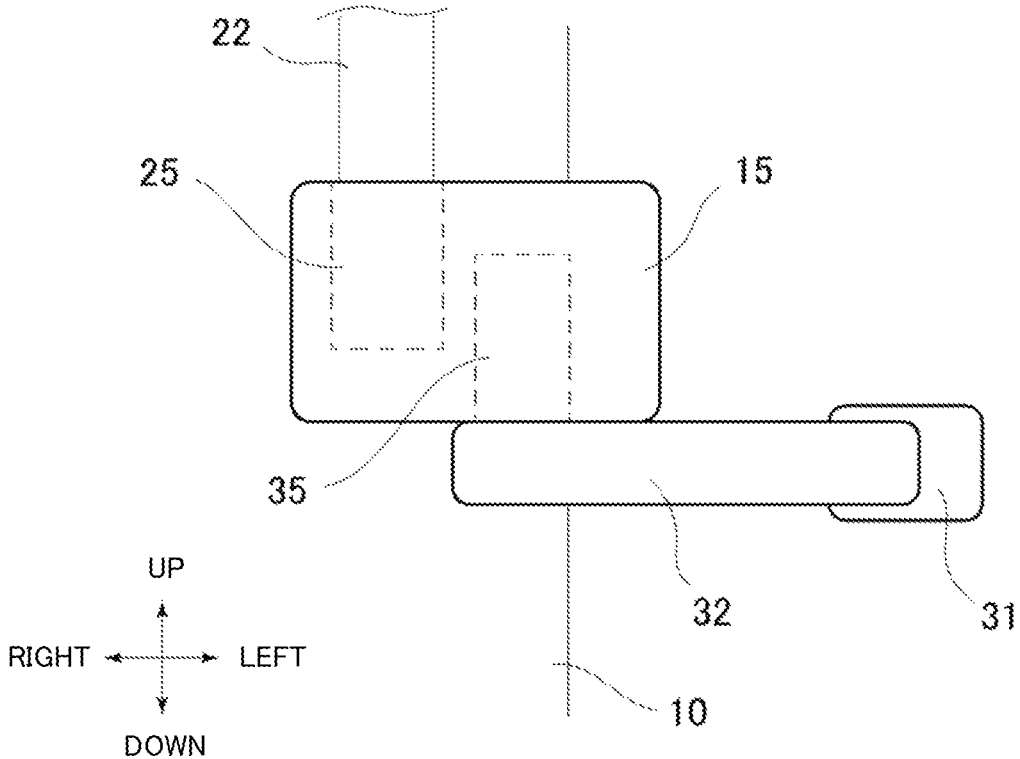
FIG. 5 is a diagram of a sensor arm and a cover when viewed from the front side of the vehicle.

FIG. 5 is a diagram of the sensor arm 32 and the cover 15 when viewed from the front side of the vehicle. As described in the present embodiment, a connector between the sensor arm 32 and the support mechanism 35 (in other words, a portion where the sensor arm 32 is rotatably supported by the support mechanism 35) provided on the lower surface of the cover 15 offers the following advantages. Specifically, rain drops or dust are less likely to enter the connector, and therefore the rotation performance of the sensor arm 32 is less likely to be deteriorated, and the support mechanism 35 is less likely to fail, for example.

Figure 3:
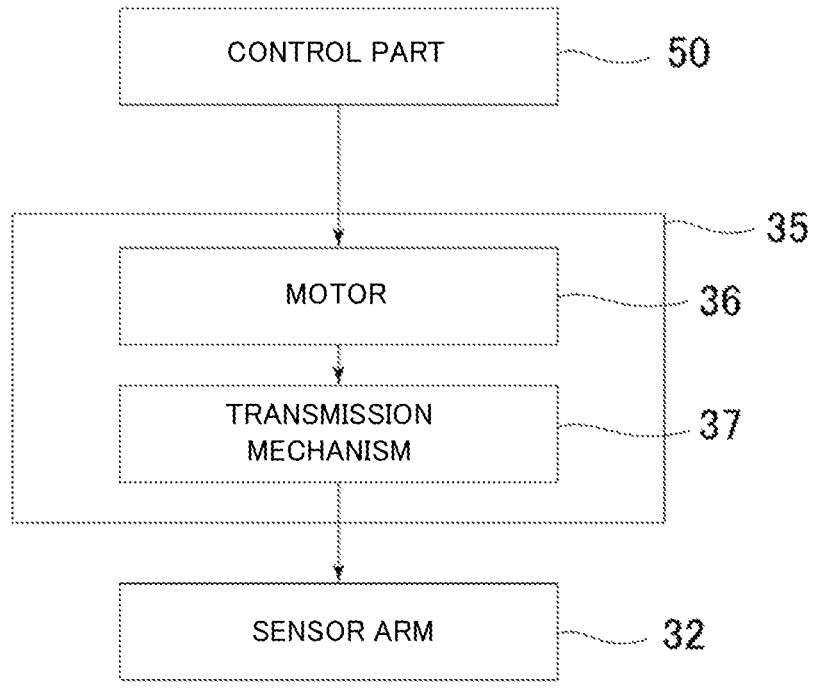
FIG. 3 is a block diagram showing an example of a configuration for moving a sensor.

FIG. 3 is a block diagram showing an example of a configuration for moving the sensor. The vehicle S100 may include a control part 50 for operating the sensor arm 32, as shown in FIG. 3.

In this example, the support mechanism 35 includes a motor 36 and a transmission mechanism 37. The motor 36 generates power for pivoting the sensor arm 32. The transmission mechanism 37 is a mechanism that transmits power from the motor 36 to the sensor arm 32. The transmission mechanism 37 includes a rotating shaft protruding downward from the lower surface of the cover 15. The sensor arm 32 is fixed to the rotating shaft, for example.

The control part 50 controls the motor 36, thereby moving the sensor arm 32. The control part 50 moves the sensor arm 32 in response to input from the driver, for example. The input from the driver may be input by the driver pressing a predetermined switch or input by voice, as an example.

The control part 50 moves the sensor arm 32 to a predetermined position within a movable range of the sensor arm 32, as an example. The "predetermined position" may be any position within the movable range of the sensor arm 32, or may be one or several positions that have been set in advance within the movable range. Specifically, the control part 50 adjusts a pivot angle of the sensor arm 32 by controlling the rotation of the motor 36. Such a configuration allows changing of a protruding length Rp (FIG. 2) of the sensor 31 from the vehicle cabin 10.

The control part 50 may change the position of the sensor 31 by moving the sensor arm 32 in accordance with the width of the mounted equipment 12. Specifically, the control part 50 may move the sensor arm 32 so that the protruding length Rp (the length from the side surface of the vehicle cabin 10 to the sensor 31) becomes equal to or greater than a predetermined value that allows the sensor 31 to detect the region on the rear side of the vehicle S100 (which refers to a side that is rearward from the front surface of the mounted equipment 12). An example of this operation will be described below.

Figure 4:
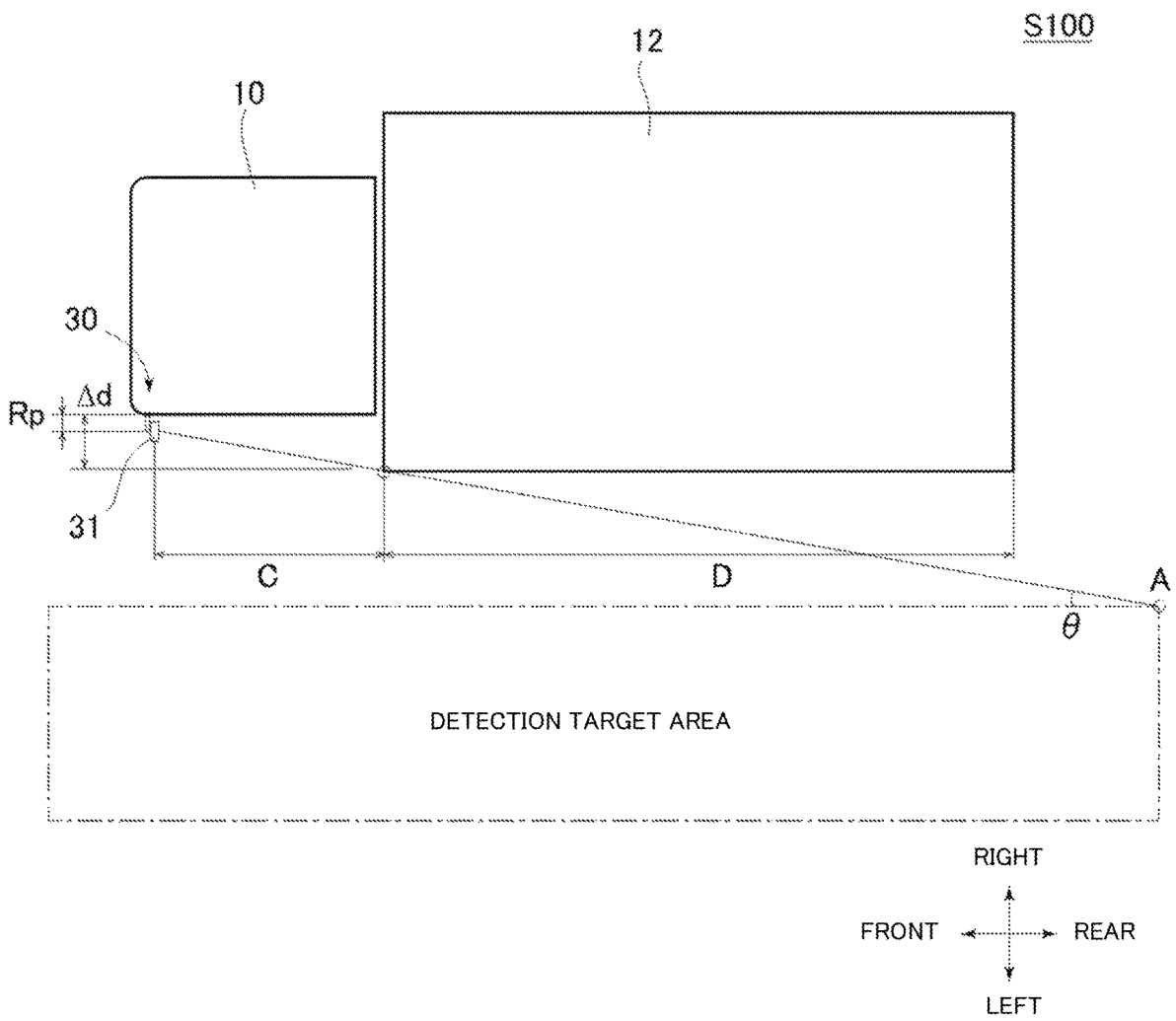
FIG. 4 is a schematic diagram illustrating a protruding length of a sensor and a detection range of the sensor.

FIG. 4 is a schematic diagram illustrating a protruding length of the sensor and a detection range of the sensor. FIG. 4 is a diagram of the vehicle S100 when viewed from the top. In the vehicle S100, a detectable range of the sensor 31 changes depending on the size and shape of the mounted equipment 12 to be mounted. Meanwhile, it is necessary to consider the target area of the Blind Spot Information System (BSIS) regarding the detection range of the sensor 31. The BSIS is a system that detects and notifies the driver of approaching bicycles or other objects on the left side of the vehicle body. In the present embodiment, the detection target area of the sensor is assumed to be the target area of the BSIS. It should be noted that the detection target area of the sensor is set in accordance with the sensor, and is not limited to the target area of the BSIS.

In FIG. 4, it is assumed that a region indicated by a one-dot chain line is the detection target area. The point A is a point to be detected by the sensor 31. The point A is the rearmost point on the vehicle side within the detection target area. The point A is likely to be hidden from the sensor 31 by the mounted equipment 12. To detect an object for the entire detection target area, it is required that a hidden object is not present on a line connecting the point A from the sensor 31. An angle θ is an angle between (i) a line connecting the sensor 31 and the point A and (ii) a line that is parallel to the longitudinal direction of the vehicle S100. In FIG. 4, C is a distance from the sensor 31 to the mounted equipment 12 in the longitudinal direction of the vehicle, and D is the length of the mounted equipment 12.

In such a configuration, in order for the sensor 31 to detect the point A, the protruding length Rp must be equal to or greater than a predetermined value described below:

$$Rp = \Delta d - C \tan\theta, \text{ where}$$

Δd is a protruding length of the mounted equipment from the side surface of the vehicle cabin and C is a distance from the sensor to the mounted equipment in the longitudinal direction of the vehicle.

For example, the control part 50 acquires the width of the mounted equipment 12 used in the vehicle S100, and calculates Δd on the basis of the acquired width and the size of the vehicle S100 (specifically, the width of the vehicle cabin 10). The control part 50 may acquire, as the width of the mounted equipment 12, a numerical value of the width of the mounted equipment 12 input by the user, for example. The control part 50 acquires identification information of the mounted equipment 12 detected by a detection means (not shown). The control part may acquire the width of the mounted equipment 12 by referencing a storage part (not shown) that stores a plurality of types of identification information and the widths of a plurality of types of mounted equipment 12 in association with each other, and reading a width corresponding to the acquired identification information.

The control part 50 calculates a distance C and an angle θ on the basis of the length of the mounted equipment 12, the detection target area that has been set for the vehicle S100, the distance between the mounted equipment 12 and the detection target area, the size of the mounted equipment 12, the size of the vehicle S100, or the like. Then, the control part 50 determines the protruding length Rp using the above equation.

The control part 50 operates the motor 36 of the support mechanism 35 so that the sensor 31 protrudes from the vehicle cabin 10 by the determined protruding length Rp. As a result, the sensor 31 protrudes enough from the vehicle cabin 10, allowing the sensor 31 to effectively detect the region behind the vehicle S100.

The control part 50 may move the sensor 31 to a position where the protruding length Rp of the sensor 31 exceeds the above-described protruding length Rp.

In the vehicle S100 of the present embodiment, the protruding length Rp of the sensor 31 protruding from the side surface of the vehicle cabin 10 satisfies the condition of Rp≥Δd−C tan θ as described above. Therefore, the sensor 31 can effectively detect the point A.

(Effect of the Vehicle S100)

In the vehicle S100 of the present embodiment described above, the sensor 31 is supported by the sensor arm 32 provided separately from the mirror arm 22, and is provided in a manner to be pivotable. Accordingly, the position of the sensor 31 can be easily adjusted since the position of the mirror arm 22 does not affect the position of the sensor 31. In particular, the sensor 31 is positioned below the outside mirror 21 in the present embodiment, and therefore the sensor 31 can effectively detect an object that is relatively low in height even if the vehicle S100 is a large truck.

According to the configuration in which the support mechanism 35 of the sensor unit 30 is disposed in the cover 15 as described in the present embodiment, the connecting part 25 and the support mechanism 35 are covered by a common cover 15, so that the structure of the front surface of the vehicle cabin 10 is simplified. Such a configuration is also preferable in terms of preventing an increase in air resistance.

As described in the present embodiment, when the sensor arm 32 is configured to operate with the motor 36 serving as a driving source, and in particular, when the sensor arm 32 is configured to move to a predetermined position within its movable range, the present embodiment has an advantage that the sensor 31 can be moved to a desired predetermined position without having the driver adjust the position of the sensor 31.

According to the configuration in which the control part 50 moves the sensor arm 32 to a predetermined position in accordance with the width of the mounted equipment 12 to change the position of the sensor 31 as described in the present embodiment, an operation by the driver or the like to adjust the position of the sensor 31 is simplified.

In the configuration in which the sensor 31 always protrudes to one side of the vehicle cabin 10, when the vehicle S100 travels on a narrow road, or when the vehicle S100 is parked, the sensor 31 might hit another vehicle, an installation, or the like on the side of the road. In this regard, according to the configuration in which the control part 50 moves the sensor arm 32 to adjust the position of the sensor 31 as described in the embodiment, the present embodiment has an advantage that the driver can move the sensor 31 in any situation.

Variation Example

The support mechanism 35 may not only pivot the sensor arm 32 around a predetermined rotation axis but also have a function of linearly moving the sensor arm 32 along a predetermined direction. For example, the support mechanism 35 may have a linear motion mechanism that extends the sensor arm 32 outward in the vehicle width direction so that the protruding length Rp is further increased in the state shown in FIG. 2. The support mechanism 35 may include only such a linear mechanism instead of a pivot mechanism.

The control part 50 acquires identification information of the mounted equipment 12. The control part 50 may reference the storage part that stores a plurality of protruding lengths Rp of the sensor in association with a plurality of types of identification information to read a protruding length Rp of the sensor 31 corresponding to the acquired identification information. The protruding length Rp is a length that has been set in advance according to the size of the mounted equipment 12, and reaches a position at which the sensor 31 can detect the point A in the rear when the sensor 31 is positioned at a point that results in the protruding length Rp. The control part 50 moves the sensor arm 32, which is a support member, so that the sensor 31 is positioned at a point that results in the protruding length Rp.

The present disclosure is explained on the basis of the exemplary embodiments. The technical scope of the present disclosure is not limited to the scope explained in the above embodiments and it is possible to make various changes and modifications within the scope of the invention. For example, all or part of the apparatus can be configured with any unit which is functionally or physically dispersed or integrated. Further, new exemplary embodiments generated by arbitrary combinations of them are included in the exemplary embodiments. Effects of the new exemplary embodiments brought by the combinations also have the effects of the original exemplary embodiments.

What is claimed is:

1. A vehicle comprising:
a vehicle cabin where a driver sits;
a sensor that is arranged below an outside mirror of the vehicle cabin and detects a region behind a vehicle;
a support member that is provided separately from a mirror arm supporting the outside mirror and supports the sensor; and
a support mechanism that pivotally supports the support member relative to the vehicle cabin, wherein
the vehicle is configured to be equipped with mounted equipment at a rear of the vehicle, and
a protruding length Rp of the sensor protruding from a side surface of the vehicle cabin satisfies:

$$Rp \geq \Delta d - C \tan \theta, \text{ where}$$

Δd is a protruding length of the mounted equipment from a side surface of the vehicle cabin,
C is a distance from the sensor to the mounted equipment in a longitudinal direction of the vehicle, and
θ is an angle between (i) a line connecting the sensor and a rearmost point on a vehicle side within a detection target region at the side of the vehicle and (ii) a line that is parallel to the longitudinal direction of the vehicle.

2. The vehicle according to claim 1, further comprising:
a cover that covers a connecting part where the mirror arm is connected to the vehicle cabin, wherein
the support mechanism is disposed inside the cover together with the connecting part.

3. The vehicle according to claim 2, wherein
the support member is positioned below the cover, and a connector between the support member and the support mechanism is provided on a lower surface of the cover and is covered by the cover from above.

4. The vehicle according to claim 2, wherein
the mirror arm protrudes upward from the cover.

5. The vehicle according to claim 1, wherein
the support mechanism includes a motor that generates power for pivoting the support member, and
the vehicle further comprises a controller including a processor configured to the support member to a predetermined position within a movable range of the support member by controlling the motor.

6. The vehicle according to claim 5, wherein the processor of the controller is further configured to move the support member so that a protruding length of the sensor from the vehicle cabin becomes equal to or greater than a predetermined value allowing the sensor to detect a region behind the vehicle, in accordance with a width of mounted equipment attached to the vehicle.

7. The vehicle according to claim 5, wherein the controller acquires identification information of mounted equipment, references a memory configured to store a plurality of protruding lengths of the sensor in association with a plurality of types of identification information, reads a protruding length of the sensor corresponding to the acquired identification information, and moves the support member so that the sensor is positioned at a point that results in the protruding length of the sensor.

\* \* \* \* \*